July 9, 1963

E. D. HENDRIKSON ETAL 3,096,868

HAY BALE PICK-UP AND CONVEYOR IMPLEMENT

Filed Sept. 13, 1961

INVENTORS.
EDWARD D. HENDRIKSON
JOSEPH P. LOGAS
BY
Merchant, Merchant &
Gould
ATTORNEYS

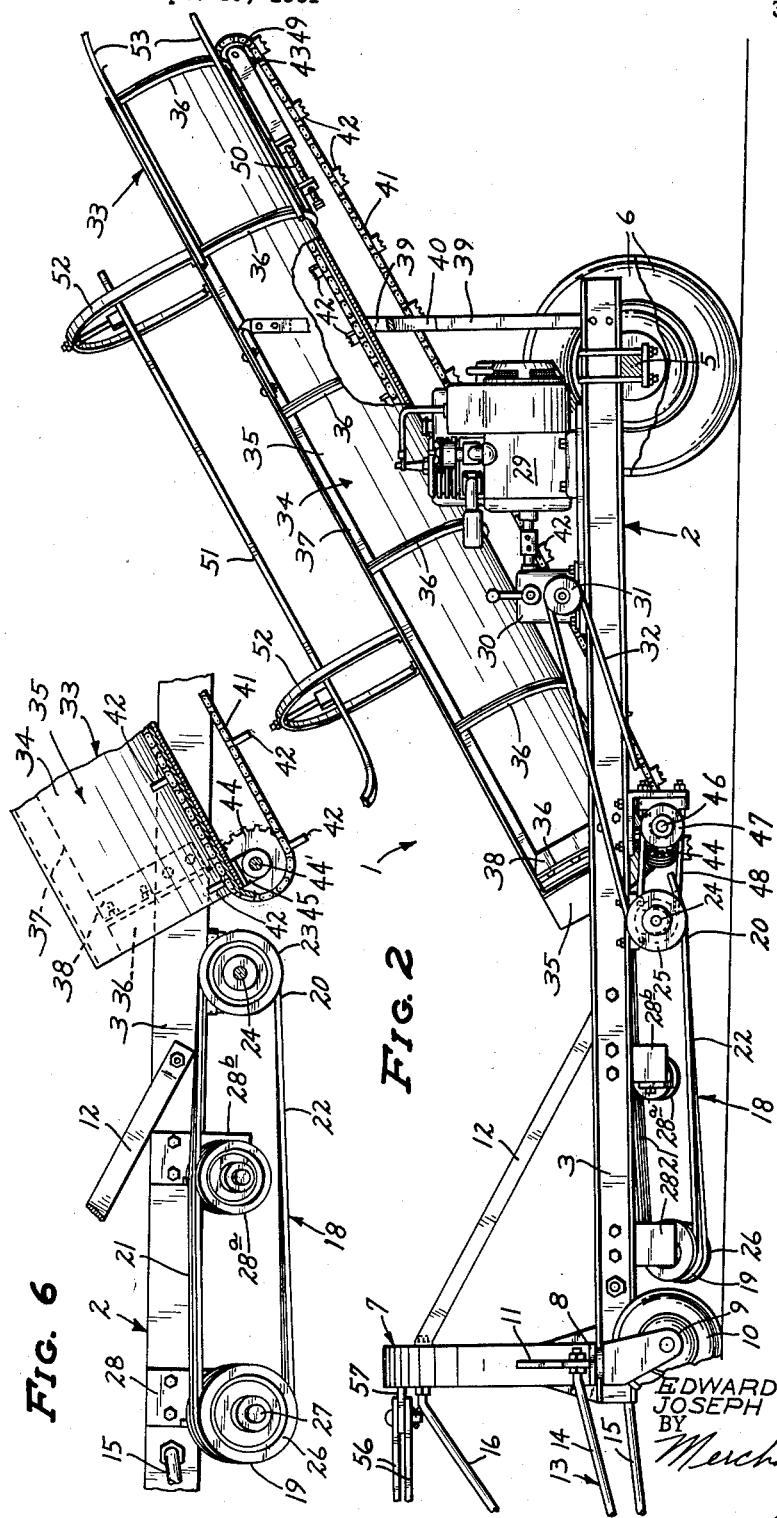

July 9, 1963
E. D. HENDRIKSON ETAL
3,096,868
HAY BALE PICK-UP AND CONVEYOR IMPLEMENT
Filed Sept. 13, 1961
3 Sheets-Sheet 3
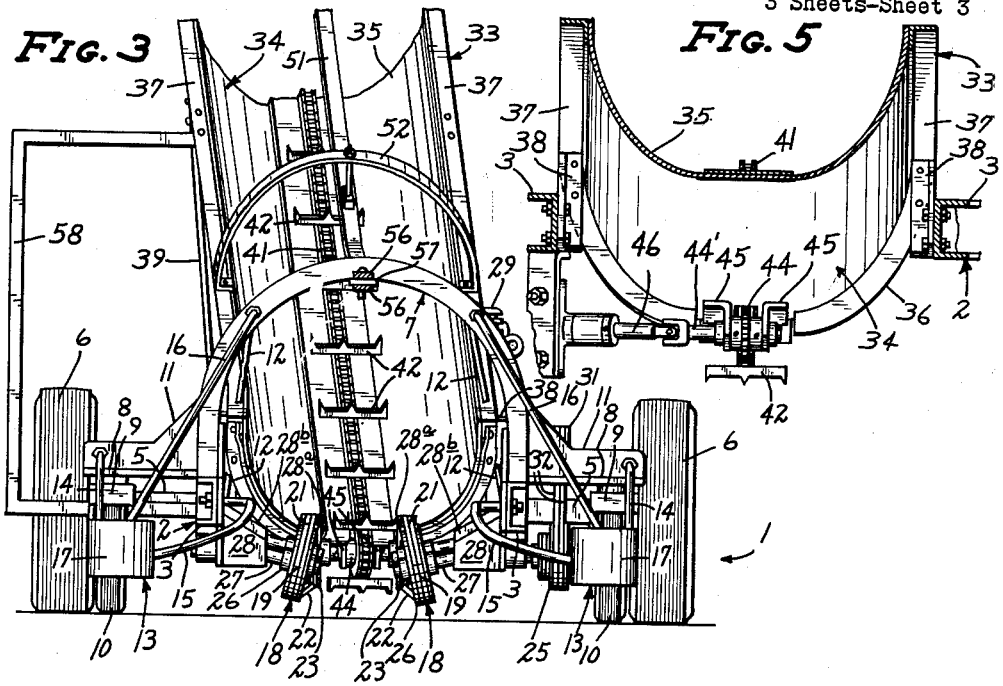
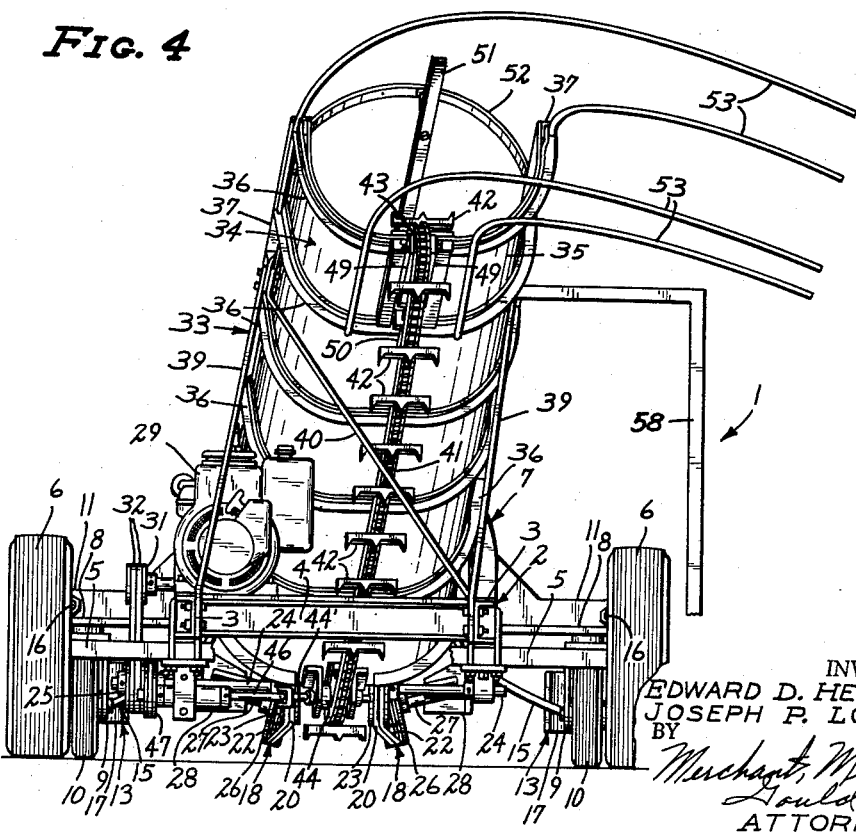
INVENTORS.
EDWARD D. HENDRIKSON
JOSEPH P. LOGAS
BY
Merchant, Merchant &
Gould
ATTORNEYS

United States Patent Office 3,096,868
Patented July 9, 1963

3,096,868
HAY BALE PICK-UP AND CONVEYOR IMPLEMENT
Edward D. Hendrikson, St. Paul, and Joseph P. Logas, Buffalo, Minn.; said Hendrikson assignor of two-sixths to Maxine Wilson Lopp, Grand Rapids, Minn.
Filed Sept. 13, 1961, Ser. No. 137,827
5 Claims. (Cl. 198—9)

This invention relates generally to farm implements and farm machinery, and more particularly it relates to a hay bale pick-up and conveyor implement for use in connection with and to be propelled by a powered vehicle such as a tractor.

This invention further relates to hay bale pick-up and conveyor implements of the type which are designed and constructed with a collecting and funneling mouth defined at the front of the implement for engaging hay bales randomly scattered on the ground in the path of travel of said implement.

An important object of this invention is the provision of a hay bale pick-up and conveyor implement which is provided with V-belt means for lifting the hay bales from the ground after they have been collected by the above noted funneling mouth of said implement and for conveying the same to an upper position in spaced relation to the ground.

Another object of this invention is the provision of a hay bale pick-up and conveyor implement which is so designed and constructed as to enable the same to pick-up and convey hay bales which may be randomly scattered on the ground, and which will do so without regard to the position of the various hay bales with respect to the ground, and also without regard to the particular pattern in which the hay bales are scattered upon the ground.

Another object of this invention is the provision of a hay bale pick-up and conveyor implement which may be adjusted to pick-up and convey hay bales of varying shapes and sizes, but which is extremely efficient in collecting and conveying hay bales of the round cylindrical type.

A still further object of this invention is the provision of a hay bale pick-up and conveyor implement which is formed and constructed so as to regiment the engaged hay bales in a generally uniform manner as they are collected and conveyed toward the rear of said implement.

Still further objects of this invention reside in the provision of a hay bale pick-up and conveyor implement which is relatively simple but extremely durable and strong in construction, relatively economical to manufacture, and highly efficient in sustaining the above noted purposes thereof.

The foregoing and other objects and advantages of this invention will become apparent from the following detailed specification, appended claims and attached drawings.

Referring to the drawings wherein like reference characters indicate like parts or elements throughout the several views:

FIG. 2 is a view in side elevation of this invention, some parts being broken away and some parts shown in section;

FIG. 3 is a view in front elevation of this invention, some parts being broken away and some parts shown in section;

FIG. 4 is a view in rear elevation of this invention, some parts being broken away;

FIG. 5 is a view in transverse vertical section taken approximately on the line 5—5 of FIG. 1; and FIG. 6 is a view in longitudinal vertical section taken approximately on the line 6—6 of FIG. 1.

Figure 1:
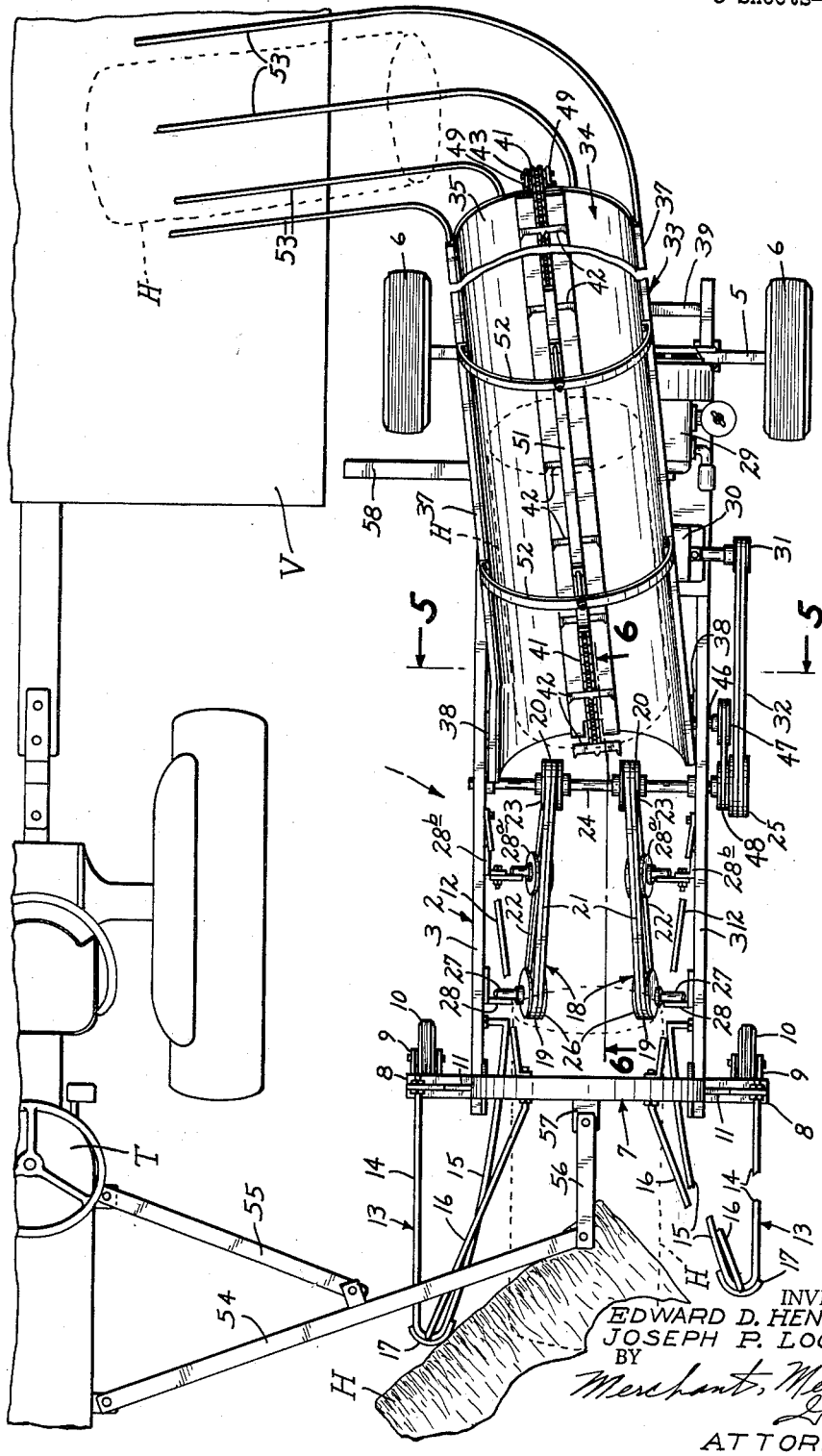
FIG. 1 is a view in top plan of this invention, some parts being broken away, and showing the invention in operative connection with a tractor and loading trailer, and also showing the hay bales being handled by this invention in dotted lines.

Referring with greater particularity to the drawings, the novel hay bale pick-up and conveyor implement is represented in its entirety by the reference numeral 1, and the rigid frame thereof is represented generally by the reference numeral 2. The frame 2 comprises a pair of generally parallel transversely spaced longitudinal frame bars 3 and rear transverse frame bars 4 which are rigidly secured together by conventional means. A rear axle 5 having rear wheels 6 is carried by the frame 2 so as to adapt the implement 1 for movement generally in the direction of the longitudinal axis thereof. Also, a front transverse frame member, represented generally by the reference numeral 7, carries a pair of rigidly secured suspension arms 8, which are each equipped with spindle forks 9. The spindle forks 9 are journalled for rotation about generally vertically extending axes and carry front wheels 10. As seen particularly in FIG. 5, the front transverse frame member 7 is formed in a pronounced upwardly bowing arc, the purpose of which will be hereinafter specifically set forth. It is noted that the upwardly bowed transverse member 7 is strengthened by a pair of bracing plates 11 which are one each secured to the suspension arms 8 on opposite sides of the transvere frame member 7, and also by a pair of downwardly and rearwardly extending bracing struts 12 which are rigidly secured at their forward ends to the transverse frame members 7 and are rigidly secured at their rearward ends to the longitudinal frame bars 3.

Referring particularly to FIGS. 1 and 3, laterally outwardly and forwardly diverging members, represented generally by the reference numeral 13, are secured generally at the front of the implement frame 2 and are arranged so as to form a collecting and funneling mouth for engaging hay bales randomly scattered on the ground in the path of travel of the implement 1, one of such hay bales being represented by the reference letter H in FIG. 1. It is noted that the diverging members 13 are further adapted for aranging the collected hay bales with their longitudinal axes generally parallel to the longitudinal axis of the implement 1 and for orientating the same toward the rear of the funneling mouth, such as is represented by dotted lines in FIG. 1. Each of the diverging members 13 comprises an outer generally horizontal longitudinal lower bar 14 rigidly secured at its rearward end to the associated bracing plate 11, a generally horizontal forwardly and outwardly extending inner lower bar 15 rigidly secured at its rearward end to the associated longitudinal frame bar 3 of the implement frame 2, and a generally upwardly and rearwardly inclined generally forwardly and outwardly extending upper bar 16 rigidly secured at its rearward end to the upwardly bowed front transverse frame member 7. The outer longitudinal bar 14, inner bar 15 and upper bar 16 of each of the diverging members 13 are rigidly connected together at their generally forward portions and carry a bumper plate 17. It is noted that one of the diverging members 13 may be formed so as to project forwardly a greater distance from the implement frame 2 than the other thereof so as to enhance the gathering or collecting efficiency of the diverging members 13. As seen particularly in FIG. 3, the upwardly bowed front transverse frame member 7 defines a throat generally at the rear of the above described funneling mouth for permitting the passage of the collected and longitudinally arranged hay bales.

In accordance with this invention, V-belt means is provided for lifting and conveying the hay bales from the ground which are collected and funneled by the above described funneling mouth of this invention. The V-belt means comprises a pair of generally transversely spaced generally laterally outwardly and forwardly diverging generally horizontally extending endless V-belts, each of which is represented generally by the reference numeral 18. With reference to FIG. 2, it will be noted that the V-belts 18 are disposed with their forward portions 19 in more closely spaced relationship to the ground than the rearward portions 20 thereof. The forward portions 19 of the V-belts 18 are disposed adjacent the ground and adapted to engage the relatively rearwardly moving hay bales in a manner such as illustrated in FIG. 1. Means is provided for mounting and guiding the V-belts 18 for circulatory movement thereof and to define an upper flight 21 and the lower flight 22 of each thereof whereby to lift the hay bales engaged by the forward portions 19 of the V-belts 18 from the ground-supported position of the hay bales and move the same in a generally rearward direction to another position wherein the lifted hay bales are supported by the V-belts 18 in spaced relationship to the ground.

The above noted mounting and guiding means comprises a pair of transversely spaced generally co-axial rear pulleys 23 mounted for rotation upon a common shaft 24. Each of the rear pulleys 23 carries the rearward portion 20 of a different one of the V-belts 18, as shown particularly in FIGS. 1 and 6. The shaft 24 is mounted for rotation on the longitudinal frame bars 3 of the implement frame 2, one end of the shaft 24 being equipped with a multi-step pulley 25. The above noted mounting and guiding means further comprises a pair of front pulleys 26 separately mounted for rotation about generally upwardly and outwardly diverging transversely spaced front shafts 27, each of which is carried by a bracket 28 rigidly but adjustably secured to the longitudinal bars 3 of the implement frame 2. Also, a pair of transversely spaced adjustable idle pulleys 28a are disposed intermediate the front pulleys 26 and the rear pulleys 23, the same being secured to the longitudinal frame bars 3 by suitable brackets 28b. Each of the front pulleys 26 carries the forward portion 19 of a different one of the V-belts 18 whereby the forward portions 19 of the upper flight 21 of the V-belts 18 are in closer transversely spaced relationship than the lower flights 22 of the V-belts 18.

Power means is provided for imparting rotation to the shaft 24 which carries the rear pulleys 23. As shown, such power means comprises a gasoline engine 29 mounted on the implement frame 2 adjacent the rear axle 5, a transmission or gear box 30 mounted forwardly of the gasoline engine 29, the gear box 30 being equipped with a lateral pulley 31. The pulley 31 is connected to the larger sheave of the multi-step pulley 25 by suitable belts 32.

According to present practices, a generally upwardly and rearwardly inclined endless conveyor, represented generally by the reference numeral 33, is disposed adjacent the rear of the implement 1 and is adapted to elevate for loading the hay bales delivered thereto by the above described pair of V-belts 18. The endless conveyor 33 comprises an inclined cross-sectionally generally U-shaped trough structure 34 formed from sheet material 35 which is rigidly supported by a plurality of longitudinally spaced generally U-shaped ribs 36 and longitudinal frame elements 37. The lower forward portion of the trough structure 34 is rigidly supported by a pair of depending brackets 38 which are rigidly secured to the longitudinal bars 3 of the implement frame 2, and the upper rearward portion of the trough structure 34 is supported by a pair of elongated generally vertically extending side struts 39 and an angle strut 40, as seen particularly in FIG. 4. For the purpose of engaging the hay bales and elevating the same, an endless chain band 41, which is equipped with a plurality of spaced generally outwardly extending lugs 42, surrounds the generally longitudinally extending center portion of the trough structure 34. The chain band 41 is mounted for rotation on an upper sprocket wheel 43 and a lower sprocket wheel 44. The lower sprocket wheel 44 is mounted on a generally transversely extending shaft 44' which carried by a pair of depending brackets 45 rigidly secured adjacent the lower end of the trough structure 34. The shaft of the lower sprocket wheel 44 is connected by means of a universal joint to a drive shaft 46 which is journalled by suitable means within the adjacent longitudinal bar 3 of the implement frame 2, the outer end of the drive shaft 46 carrying a pulley 47 which is operatively coupled by means of a suitable belt 48 to the smaller sheave of the above described multi-step pulley 25, whereby the chain band 41 of the trough structure 34 is caused to rotate in unison with the above described V-belts 18. The upper sprocket wheel 43 is journalled and mounted by suitable brackets 49 to the upper end portion of the trough structure 34, as shown particularly in FIGS. 2 and 4, it being noted that means 50 is provided for adjusting the relative longitudinal position of the upper sprocket wheel 43. As shown particularly in FIG. 2, a guiding and hold down bar 51 for the hay bales being elevated by the endless conveyor 33 is provided, the same being supported by a pair of generally longitudinally spaced inverted U-shaped brackets 52. Referring particularly to FIGS. 1 and 4, it will be noticed that a plurality of generally laterally extending slightly flexible hay bale delivery and guiding bars 53 are rigidly secured in spaced relationship to the rearward end portion of the trough structure 34 of the endless conveyor 33. The delivery and guiding bars 53 are adapted to turn, guide and deliver the elevated hay bale in a generally lateral direction whereupon they may be loaded in the conventional manner, such as upon a trailing vehicle V being towed behind a tractor T or other towing vehicle, as shown in FIG. 1.

The above described hay bale pick-up and conveyor implement 1 is suitably connected to a towing vehicle, such as a tractor T shown in FIG. 1, by any conventional means, and an example of which is shown in FIG. 1. Such comprises a bridle structure including a forward tow bar 54, an angle bar 55, and towing links 56 which are pivotally secured to a short tongue 57 defined by the front transverse frame members 7 of the implement 1. As shown particularly in FIGS. 1 and 4, a laterally projecting bumper structure 58 is rigidly secured to the implement 1 so as to protect the rearward portion from any possible damage from contact with other cooperating units.

This invention has been specifically described above, and the operative simplicity thereof should be easily understandable without further explanation. This invention has also been thoroughly tested and found to be completely satisfactory for the accomplishment of the above objects; and while we have shown and described a preferred embodiment thereof in which the principles of the present invention have been incorporated, we wish it to be specifically understood that the same may be modified without departure from the scope and spirit of the appended claims.

What we claim is:

1. A hay bale pick-up and conveyor implement for use in connection with and to be propelled by a powered vehicle such as a tractor, said implement comprising a rigid frame, suitable carriage means secured to said frame so as to adapt said implement for movement generally in the direction of the longitudinal axis thereof, laterally outwardly and forwardly diverging members secured generally at the front of said implement frame and arranged so as to form a collecting and funneling mouth for engaging hay bales randomly scattered on the ground in the path of travel of said implement and for arranging said collected hay bales with their longitudinal axes generally parallel to the longitudinal axis of said implement and orientating the same toward the rear of said funneling mouth, endless and adjustable generally longitudinally extending V-belt means carried by said implement frame adjacent to but rearwardly of said funneling mouth, the forward portion of said V-belt means being disposed adjacent the ground and adapted to engage said relatively rearwardly moving hay bales, means mounting and guiding said V-belt means for circulatory movement thereof so as to lift the hay bales engaged by said forward portion of said V-belt means from their ground-supported position and move said bales in a generally rearward direction to another position wherein said lifted hay bales are supported by said V-belt means in spaced relationship to the ground, and power means for imparting said circulatory movement to said V-belt means.

2. A hay bale pick-up and conveyor implement for use in connection with and to be propelled by a powered vehicle such as a tractor, said implement comprising a rigid frame, suitable carriage means secured to said frame so as to adapt said implement for movement generally in the direction of the longitudinal axis thereof, laterally outwardly and forwardly diverging members secured generally at the front of said implement frame and arranged so as to form a collecting and funneling mouth for engaging hay bales randomly scattered on the ground in the path of travel of said implement and for arranging said collected hay bales with their longitudinal axes generally parallel to the longitudinal axis of said implement and orientating the same toward the rear of said funneling mouth, a pair of generally transversely spaced generally longitudinally extending V-belts carried by said implement frame adjacent to but rearwardly of said funneling mouth, the forward portions of said V-belts being disposed adjacent the ground and adapted to engage said relatively rearwardly moving hay bales, means mounting and guiding said pair of V-belts for circulatory movement thereof so as to lift the hay bales engaged by the forward portions of said V-belts from the ground-supported position of said hay bales and move the same in a generally rearward direction to another position wherein said lifted hay bales are supported by said V-belts in spaced relationship to the ground, power means for imparting said circulatory movement to said V-belts, and a generally upwardly and rearwardly inclined endless conveyor supported by said implement frame and having its forward portion disposed adjacent the rear of said pair of V-belts, said endless conveyor being adapted to elevate for loading the hay bales delivered thereto by said pair of V-belts.

3. A hay bale pick-up and conveyor implement for use in connection with and to be propelled by a powered vehicle such as a tractor, said implement comprising a rigid frame, suitable carriage means secured to said frame so as to adapt said implement for movement generally in the direction of the longitudinal axis thereof, laterally outwardly and forwardly diverging members secured generally at the front of said implement frame and arranged so as to form a collecting and funneling mouth for engaging hay bales randomly scattered on the ground in the path of travel of said implement and for arranging said collected hay bales with their longitudinal axes generally parallel to the longitudinal axis of said implement and orientating the same toward the rear of said funneling mouth, a pair of generally transversely spaced generally laterally outwardly and forwardly diverging generally horizontally extending endless V-belts carried by said implement frame adjacent to but rearwardly of said funneling mouth, the forward portions of said pair of V-belts being disposed adjacent the ground and adapted to engage said relatively rearwardly moving hay bales, means mounting and guiding said pair of V-belts for circulatory movement thereof so as to lift the hay bales engaged by the forward portions of said pair of V-belts from the ground-supported position of said hay bales and move the same in a generally rearward direction to another position wherein said lifted hay bales are supported by said pair of V-belts in spaced relationship to the ground, power means for imparting said circulatory movement to said V-belts, and a generally upwardly and rearwardly inclined endless conveyor supported by said implement frame and having its forward portion disposed adjacent the rear of said pair of V-belts, said endless conveyor being adapted to elevate for loading the hay bales delivered thereto by said pair of V-belts.

4. A hay bale pick-up and conveyor implement for use in connection with and to be propelled by a powered vehicle such as a tractor, said implement comprising a rigid frame, suitable carriage means secured to said frame so as to adapt said implement for movement generally in the direction of the longitudinal axis thereof, laterally outwardly and forwardly diverging members secured generally at the front of said implement frame and arranged so as to form a collecting and funneling mouth for engaging hay bales randomly scattered on the ground in the path of travel of said implement and for arranging said collected hay bales with their longitudinal axes generally parallel to the longitudinal axis of said implement and orientating the same toward the rear of said funneling mouth, a pair of generally transversely spaced generally laterally outwardly and forwardly diverging generally horizontally extending endless V-belts carried by said implement frame adjacent to but rearwardly of said funneling mouth, the forward portions of said V-belts being disposed adjacent the ground and adapted to engage said relatively rearwardly moving hay bales, means mounting and guiding said pair of V-belts for circulatory movement thereof and to define upper and lower flights of each thereof whereby to lift the hay bales engaged by the forward portions of said V-belts from the ground-supported position of said hay bales and move the same in a generally rearward direction to another position wherein said lifted hay bales are supported by said pair of V-belts in spaced relationship to the ground, said mounting and guiding means comprising a pair of rear pulleys mounted for rotation about the same general axis and one each of which carries the rear portion of a different one of said V-belts, and a pair of front pulleys mounted for rotation about generally upwardly and outwardly diverging axes and one each of which carries the forward portion of a different one of said V-belts whereby at least the forward portions of the upper flights of said V-belts are in closer transversely spaced relationship than the lower flights of said V-belts, said implement further comprising power means for imparting rotation to said pulleys, and a generally upwardly and rearwardly inclined endless conveyor supported by said implement frame and having its forward portion disposed adjacent the rear of said pair of V-belts, said endless conveyor being adapted to elevate for loading the hay bales delivered thereto by said pair of V-belts.

5. A hay bale pick-up and conveyor implement for use in connection with and to be propelled by a powered vehicle such as a tractor, said implement comprising a rigid frame, suitable carriage means secured to said frame so as to adapt said implement for movement generally in the direction of the longitudinal axis thereof, laterally outwardly and forwardly diverging members secured generally at the front of said implement frame and arranged so as to form a collecting and funneling mouth for engaging hay bales randomly scattered on the ground in the path of travel of said implement and for arranging said collected hay bales with their longitudinal axes generally parallel to the longitudinal axis of said implement and orientating the same toward the rear of said funneling mouth, said diverging members comprising a pair of generally horizontally extending generally laterally outwardly and forwardly diverging lower bars one each disposed on an opposite side of said mouth and a pair of generally laterally outwardly and forwardly diverging and generally upwardly and rearwardly inclined bars one each disposed on an opposite side of said mouth, said implement further comprising endless and adjustable generally longitudinally extending V-belt means carried by said implement frame adjacent to but rearwardly of said funneling mouth, the forward portion of said V-belt means being disposed adjacent the ground and adapted to engage said relatively rearwardly moving hay bales, means mounting and guiding said V-belt means for circulatory movement thereof so as to lift the hay bales engaged by said forward portion of said V-belt means from their ground-supported position and move said bales in a generally rearward direction to another position wherein said lifted hay bales are supported by said V-belt means in spaced relationship to the ground, and power means for imparting said circulatory movement to said V-belt means.

References Cited in the file of this patent

UNITED STATES PATENTS

| | | |
|---|---|---|
| 1,076,670 | Gilliland | Oct. 28, 1913 |
| 2,367,970 | Smoker | Jan. 23, 1945 |